(12) United States Patent
Delos Reyes et al.

(10) Patent No.: US 12,028,270 B1
(45) Date of Patent: Jul. 2, 2024

(54) SYSTEMS AND METHODS FOR PROVIDING FIFTH-GENERATION NETWORK FUNCTION ON DEMAND RESOURCE DISTRIBUTION

(71) Applicant: Verizon Patent and Licensing Inc., Basking Ridge, NJ (US)

(72) Inventors: Emerando M. Delos Reyes, Pleasant Hill, CA (US); Satish S. Vasamsetti, San Francisco, CA (US); Jerry Steben, Fort Worth, TX (US); Helen Osias Eglip, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/153,702

(22) Filed: Jan. 12, 2023

(51) Int. Cl.
  *H04L 47/80* (2022.01)
  *H04L 47/762* (2022.01)
  *H04L 47/78* (2022.01)

(52) U.S. Cl.
  CPC .......... *H04L 47/801* (2013.01); *H04L 47/762* (2013.01); *H04L 47/781* (2013.01)

(58) Field of Classification Search
  CPC . H04L 41/0897; H04L 41/40; H04L 41/0894; H04L 41/0895; H04L 41/0873; H04W 24/02; H04W 24/04; H04W 28/08; H04W 28/0268; H04W 28/0284
  See application file for complete search history.

(56) References Cited

U.S. PATENT DOCUMENTS

| 11,026,106 | B2* | 6/2021 | Bor-Yaliniz | H04W 28/08 |
| 11,509,527 | B1* | 11/2022 | Chunduru Venkata | H04L 67/51 |
| 2020/0154292 | A1* | 5/2020 | Bor-Yaliniz | H04W 24/02 |
| 2022/0103443 | A1* | 3/2022 | Mary | H04L 43/20 |
| 2022/0269571 | A1* | 8/2022 | Mantri | G06F 11/1484 |
| 2023/0067535 | A1* | 3/2023 | Alasti | H04W 28/08 |
| 2023/0146433 | A1* | 5/2023 | Sharma | H04L 47/745 709/226 |
| 2023/0345297 | A1* | 10/2023 | Karampatsis | H04L 41/16 |
| 2023/0362678 | A1* | 11/2023 | Bega | H04L 41/16 |

* cited by examiner

*Primary Examiner* — David R Lazaro

(57) ABSTRACT

A device may receive load data identifying loads of network functions provided by a cloud computing environment, resource data associated with resources of the cloud computing environment, and resource distribution data associated with the resources. The device may perform data analytics on the load data, the resource data, and the resource distribution data to identify, from the network functions, a network function being impacted and to determine that the network function requires resource modification. The device may calculate, based on the data analytics and based on determining that the network function requires resource modification, parameters for the resource modification and may perform one or more actions based on the parameters for the resource modification.

20 Claims, 11 Drawing Sheets

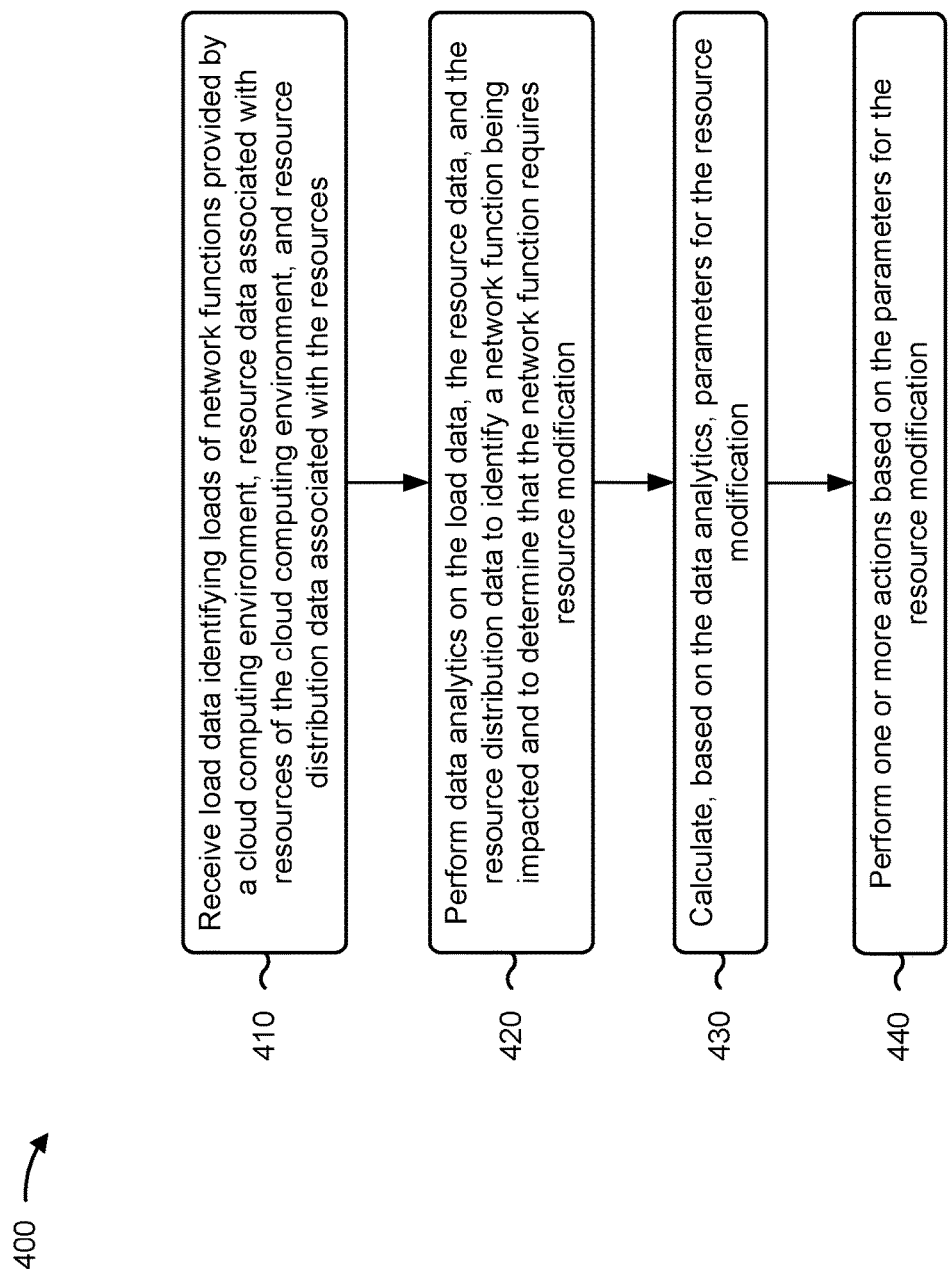

SYSTEMS AND METHODS FOR PROVIDING
FIFTH-GENERATION NETWORK
FUNCTION ON DEMAND RESOURCE
DISTRIBUTION

BACKGROUND

Fifth-generation (5G) network functions are designed to perform optimally during normal operation based on allocated preconfigured resources (e.g., processors, memory devices, storage devices, and/or the like) of a cloud computing environment.

BRIEF DESCRIPTION OF THE DRAWINGS

FIG. 4 is a flowchart of an example process for providing 5G network function on demand resource distribution.

DETAILED DESCRIPTION OF EXAMPLE EMBODIMENTS

Figure 1A:
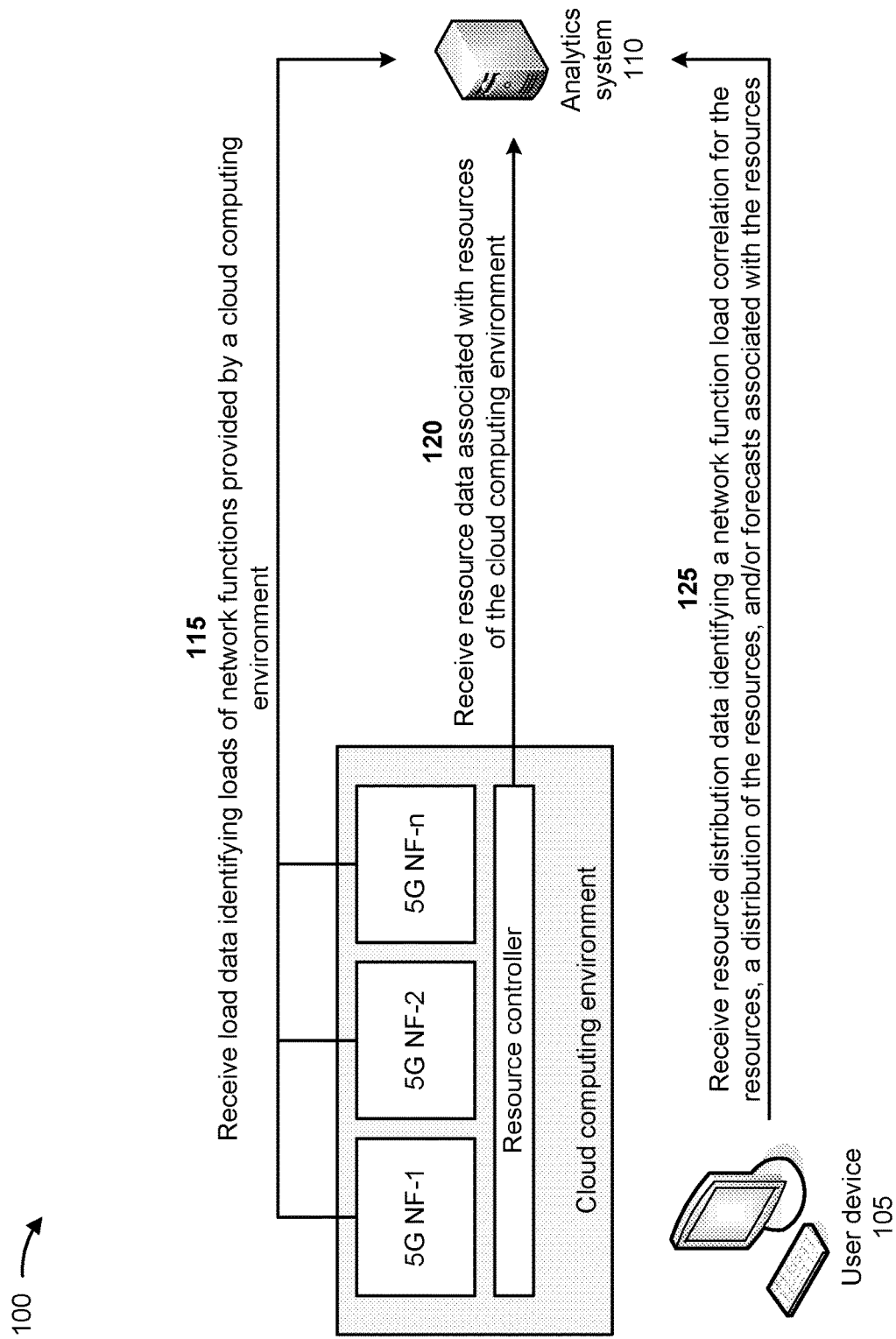
FIGS. 1A-1H are diagrams of an example associated with providing 5G network function on demand resource distribution.

The following detailed description of example implementations refers to the accompanying drawings. The same reference numbers in different drawings may identify the same or similar elements.

There may be situations (e.g., a sudden increase in subscriber demand, network outages or breakages, natural disasters, and/or the like) where a network function may suddenly exhaust allocated resources. Network function resource exhaustion may impact performance of the network function and may potentially lead to service congestion and/or a network outage. 5G network service providers may allocate reserved resources to each 5G network function during initial deployment to provide a cushion from any unforeseen spike in utilization. However, the reserved resources may not be utilized for a majority of the time and may unnecessarily increase costs for the 5G network service providers. Furthermore, 5G network functions are unable to provide information indicating that allocated resources are being exhausted or minimally utilized. Thus, current techniques for managing 5G network functions consume computing resources (e.g., processing resources, memory resources, communication resources, and/or the like), networking resources, and/or other resources associated with allocating resources that are minimally utilized, losing network data due to service congestion and/or network outage, handling lost network data caused by resource exhaustion, attempting to identify a network function associated with exhausted resources, and/or the like.

Some implementations described herein provide an analytics system that provides 5G network function on demand resource distribution. For example, the analytics system may receive load data identifying loads of network functions provided by a cloud computing environment, resource data associated with resources of the cloud computing environment, and resource distribution data associated with the resources. The analytics system may perform data analytics on the load data, the resource data, and the resource distribution data to identify, from the network functions, a network function being impacted and to determine that the network function requires resource modification. The analytics system may calculate, based on the data analytics and based on determining that the network function requires resource modification, parameters for the resource modification, where the parameters may identify a magnitude of the resource modification, a time to perform the resource modification, and/or particular resources for the resource modification. The analytics system may perform one or more actions based on the parameters for the resource modification.

In this way, the analytics system provides 5G network function on demand resource distribution. For example, the analytics system may receive load data associated with network functions provided by a cloud computing environment, resource data associated with resources of the cloud computing environment, and resource distribution data. The analytics system may perform data analytics on the load data, the resource data, and the resource distribution data to identify a network function that requires resource modification. The analytics system may determine parameters for the resource modification (e.g., a magnitude of the resource modification, a time to perform the resource modification, particular resources of the cloud computing environment to modify, and/or the like) and may perform the resource modification based on the parameters. Thus, the analytics system may conserve computing resources, networking resources, and/or other resources that would have otherwise been consumed by allocating resources that are minimally utilized, losing network data due to service congestion and/or network outage, handling lost network data caused by resource exhaustion, attempting to identify a network function associated with exhausted resources, and/or the like.

FIGS. 1A-1H are diagrams of an example 100 associated with providing 5G network function on demand resource distribution. As shown in FIGS. 1A-1H, example 100 includes a user device 105, a cloud computing environment (e.g., that includes a resource controller and multiple 5G network functions (e.g., 5G NF-1, 5G NF-2, 5G NF-n)), and an analytics system 110. Further details of the user device 105, the computing environment, the resource controller, the 5G network functions, and the analytics system 110 are provided elsewhere herein. Although implementations described herein depict a single user device 105 and a single cloud computing environment, in some implementations, the analytics system 110 may be associated with multiple user devices 105 and/or cloud computing environments.

As shown in FIG. 1A, the resource controller may control resources (e.g., computing resources, networking resources, and/or other resources) associated with the cloud computing environment. The resource controller may control and utilize the resources to generate the multiple network functions provided by the cloud computing environment. The user device 105 may enable a user (e.g., a network administrator) to provide inputs for controlling the resources and/or the multiple network functions of the cloud computing environment. In some implementations, a network function may include a 5G network function, such as a network slice selection function (NSSF), a network exposure function (NEF), an authentication server function (AUSF), a network repository function (NRF), a policy control function (PCF), an application function (AF), an access and mobility management function (AMF), a session management function (SMF), a user plane function (UPF), and/or the like.

As further shown in FIG. 1A, and by reference number 115, the analytics system 110 may receive load data identifying loads of network functions provided by a cloud computing environment. For example, the multiple network functions may experience loads associated with utilization of the network functions. A load on a network function may increase when more traffic is received by the network function, and a load on the network function may decrease when less traffic is received by the network function. The network functions may generate the load data identifying the loads of the network functions and may provide the load data to the analytics system 110. The analytics system 110 may receive the load data from the network functions. In some implementations, the analytics system 110 may continuously receive the load data from the network functions, may periodically receive the load data from the network functions (e.g., via heartbeat requests), may receive the load data from the network functions based on providing requests for the load data to the network functions, and/or the like. In some implementations, the analytics system 110 may store the load data in a data structure (e.g., a database, a table, a list, and/or the like) associated with the analytics system 110.

As further shown in FIG. 1A, and by reference number 120, the analytics system 110 may receive resource data associated with resources of the cloud computing environment. For example, the resource controller of the cloud computing environment may monitor the resource data associated with the resources of the cloud computing environment. The resource data may include data identifying utilization of the resources (e.g., the processors, memory devices, storage devices, networking devices, and/or the like) of the cloud computing environment, capacities of the resources, geographical locations of the resources, and/or the like. The resource controller may provide the resource data to the analytics system 110, and the analytics system 110 may receive the resource data from the resource controller. In some implementations, the analytics system 110 may continuously receive the resource data from the resource controller, may periodically receive the resource data from the resource controller (e.g., when there is a change in resource utilization), may receive the resource data from the resource controller based on providing a request for the resource data to the resource controller, and/or the like. In some implementations, the analytics system 110 may store the resource data in the data structure associated with the analytics system 110.

As further shown in FIG. 1A, and by reference number 125, the analytics system 110 may receive resource distribution data identifying a network function load correlation for the resources, a distribution of the resources, and/or forecasts associated with the resources. For example, the user may input the resource distribution data to the user device 105. The resource distribution data may include data identifying the network function load correlation for the resources (e.g., when a load of a network function increases, what other network functions will experience a load increase), a distribution of the resources (e.g., a percentage of the resources distributed per network function), and/or forecasts associated with the resources (e.g., a load change and resource modification forecast, subscriber forecasts, resource availability and diversity correlations, and/or the like). The user device 105 may provide the resource distribution data to the analytics system 110, and the analytics system 110 may receive the resource distribution data from the user device 105. In some implementations, the analytics system 110 may store the resource distribution data in the data structure associated with the analytics system 110.

Figure 1B:
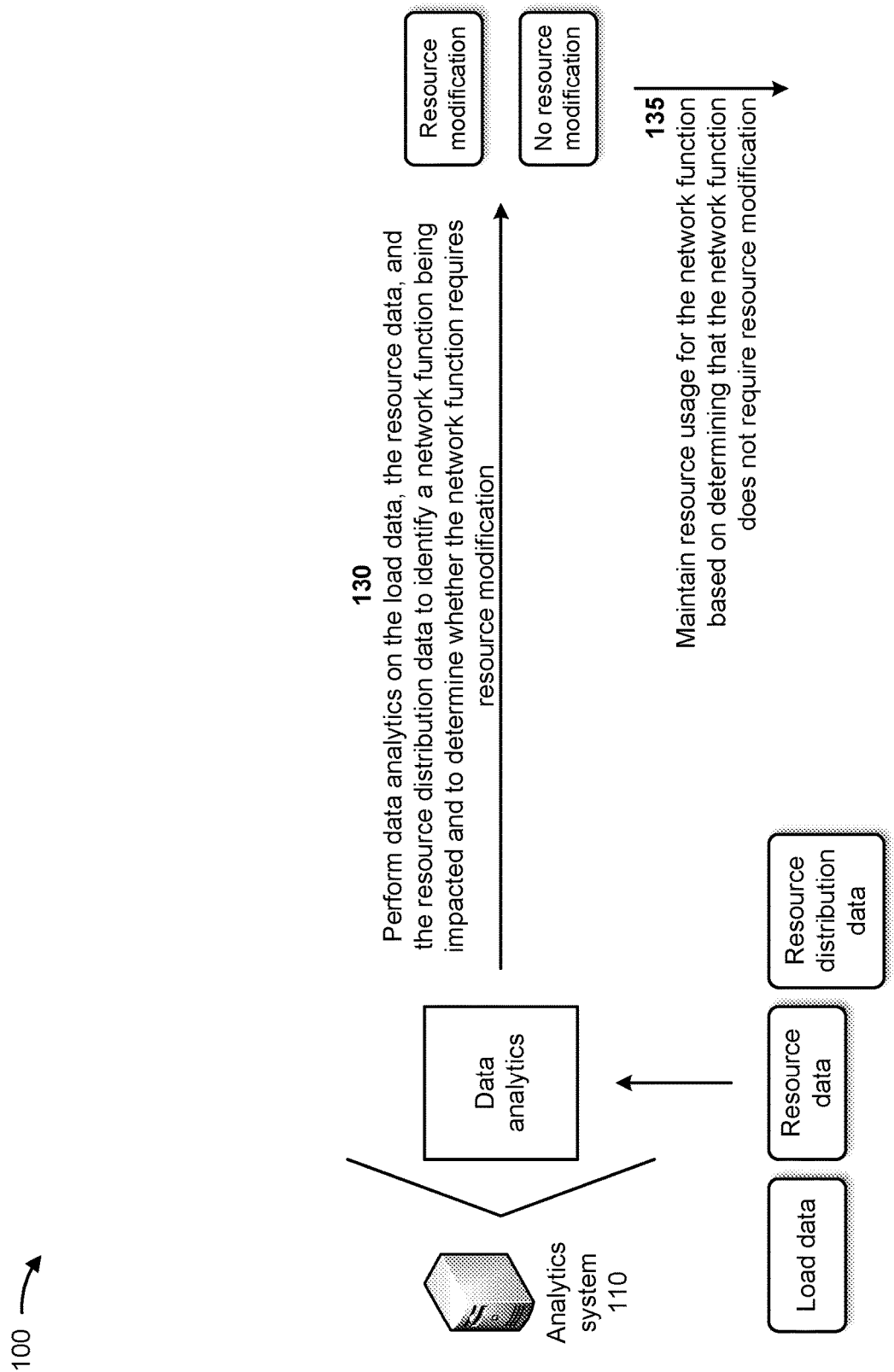

As shown in FIG. 1B, and by reference number 130, the analytics system 110 may perform data analytics on the load data, the resource data, and the resource distribution data to identify a network function being impacted and to determine whether the network function requires resource modification. For example, the analytics system 110 may utilize multiple data analytics techniques to examine data sets (e.g., the load data, the resource data, and the resource distribution data) in order to find trends and draw conclusions about information contained in the data sets. The data analytics techniques may include exploratory data analysis (EDA), confirmatory data analysis (CDA), quantitative data analysis, and qualitative data analysis. Exploratory data analysis aims to find patterns and relationships in data, while confirmatory data analysis applies statistical techniques to determine whether hypotheses about a data set are true or false. Quantitative data analysis involves the analysis of numerical data with quantifiable variables (e.g., that can be compared or measured statistically). Qualitative data analysis focuses on understanding content of non-numerical data, such as text, images, audio, video, common phrases, themes, points of view, and/or the like.

In some implementations, the analytics system 110 may utilize advanced types of data analytics, such as data mining, predictive analytics, machine learning, big data analytics, and/or the like. Data mining involves sorting through large data sets to identify trends, patterns, and relationships. Predictive analytics seek to predict events (e.g., customer behavior, equipment failures, future business scenarios). Automated machine learning models may be utilized to analyze data sets more quickly than data scientists can do via conventional analytical modeling. Big data analytics applies data mining, predictive analytics, and machine learning models to data sets that can include a mix of structured, unstructured, and semi-structured data.

In some implementations, the analytics system 110 may perform data analytics on the load data, the resource data, and the resource distribution data to identify, from the multiple network functions, a network function being impacted. For example, the data analytics may indicate that the network function is exhausting resources of the cloud computing environment, that the network function is underutilizing resources of the cloud computing environment, and/or the like. In some implementations, the analytics system 110 may perform data analytics on the load data, the resource data, and the resource distribution data to determine whether the network function requires resource modification. For example, if the network function is exhausting resources, the data analytics may determine that the network function requires a resource modification of receiving additional resources from the cloud computing environment. In some implementations, the analytics system 110 may determine that the network function requires resource modification. Alternatively, the analytics system 110 may determine that the network function does not require resource modification. In some implementations, the analytics system 110 may determine that multiple network functions are impacted and/or require resource modifications.

As further shown in FIG. 1B, and by reference number 135, the analytics system 110 may maintain resource usage for the network function based on determining that the network function does not require resource modification. For example, when the analytics system 110 determines that the network function does not require resource modification, the analytics system 110 maintain the resource usage for the network function. In this way, the network function may continue to operate with current allocated resources from the cloud computing environment.

Figure 1C:
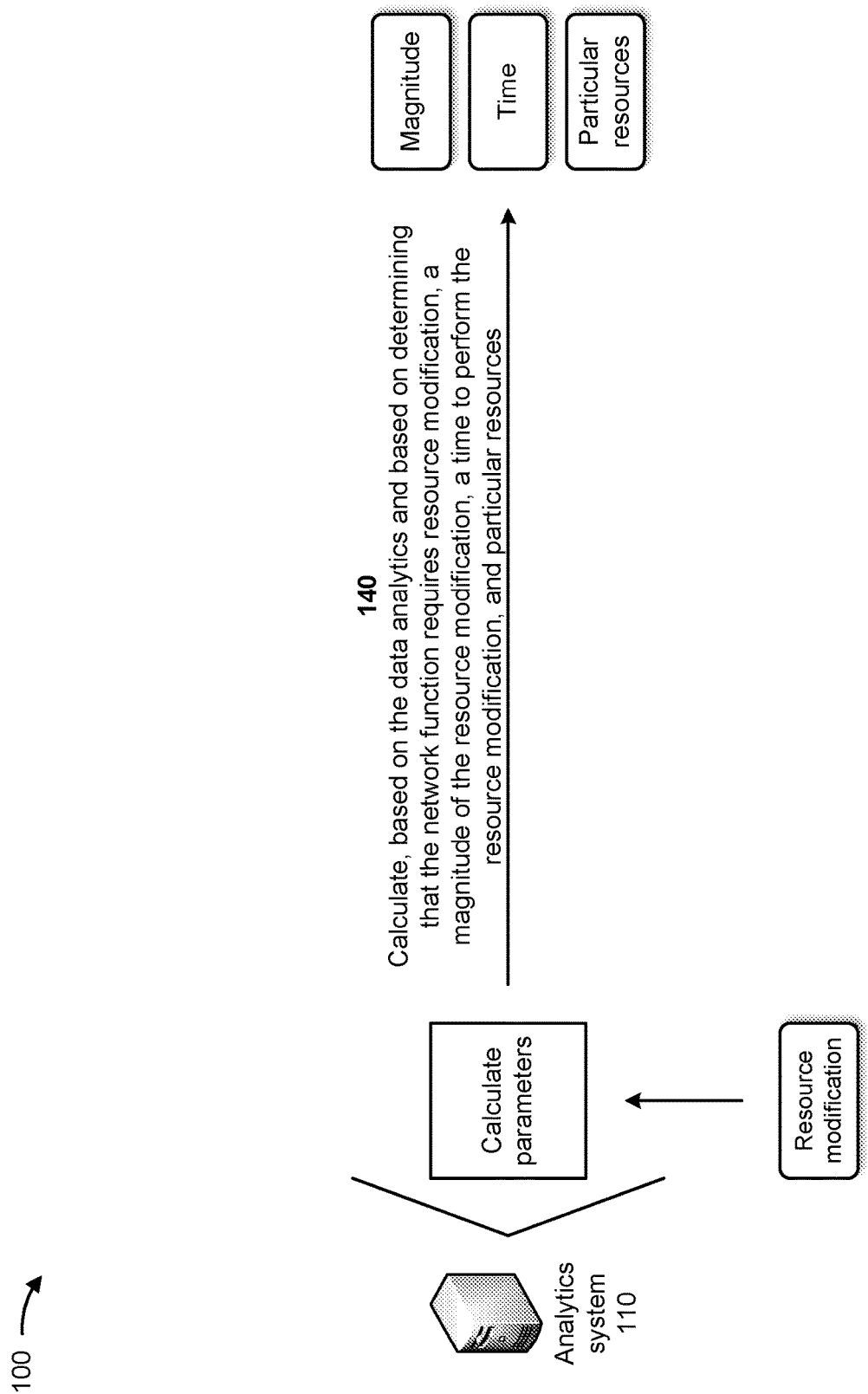

As shown in FIG. 1C, and by reference number 140, the analytics system 110 may calculate, based on the data analytics and based on determining that the network function requires resource modification, a magnitude of the resource modification, a time to perform the resource modification, and particular resources to utilize for the resource modification. For example, when the analytics system 110 determines that the network function requires resource modification, the analytics system 110 may calculate parameters for the resource modification based on the data analytics. In some implementations, the parameters for the resource modification may include a parameter identifying a magnitude of the resource modification (e.g., how much resource modification is required), a parameter identifying a time to perform the resource modification, a parameter identifying particular resources (e.g., available resources of the cloud computing environment) for the resource modification, and/or the like.

Figure 1D:
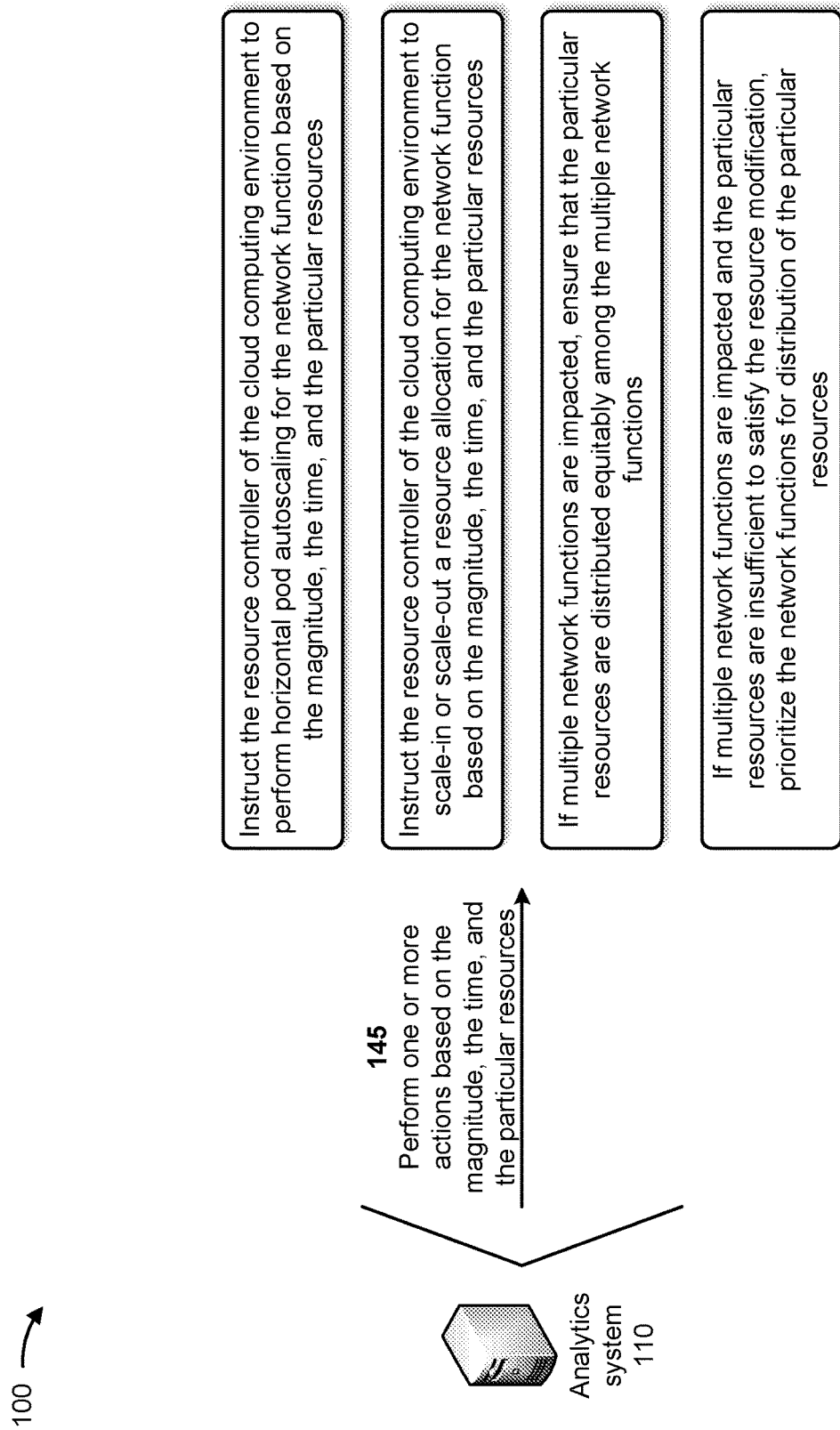

As shown in FIG. 1D, and by reference number 145, the analytics system 110 may perform one or more actions based on the magnitude, the time, and the particular resources. For example, the analytics system 110 may perform the one or more actions based on the parameters for the resource modification (e.g., the magnitude of the resource modification, the time to perform the resource modification, the particular resources for the resource modification, and/or the like).

In some implementations, performing the one or more actions includes the analytics system 110 instructing the resource controller of the cloud computing environment to perform horizontal pod autoscaling for the network function based on the magnitude, the time, and the particular resources. For example, the analytics system 110 may determine that the parameters for the resource modification indicate that horizontal pod autoscaling is required for the network function. Horizontal pod autoscaling may include modifying a workload of the network function by automatically increasing a quantity of resources allocated for the network function. The analytics system 110 may instruct the resource controller to perform the horizontal pod autoscaling for the network function, and the resource controller may perform the horizontal pod autoscaling in the cloud computing environment based on the instruction. In this way, the analytics system 110 may conserve computing resources, networking resources, and/or other resources that would have otherwise been consumed by losing network data due to service congestion and/or network outage.

In some implementations, performing the one or more actions includes the analytics system 110 instructing the resource controller of the cloud computing environment to scale-in or scale-out a resource allocation for the network function based on the magnitude, the time, and the particular resource. For example, the analytics system 110 may determine that the parameters for the resource modification indicate that scaling in (e.g., decreasing) or scaling out (e.g., increasing) a resource allocation is required for the network function. The analytics system 110 may instruct the resource controller to decrease or increase the resource allocation for the network function, and the resource controller may cause the cloud computing environment to decrease or increase the resource allocation for the network function based on the instruction. The instruction may include an identifier of the network function, identifiers of multiple network functions (e.g., if multiple network functions are impacted), a resource modification request for each of the multiple network functions, a resource percentage increase or decrease for each of the multiple network functions, a timing when the scaling should occur, and/or the like. In this way, the analytics system 110 may conserve computing resources, networking resources, and/or other resources that would have otherwise been consumed by handling lost network data caused by resource exhaustion.

In some implementations, if multiple network functions are impacted, performing the one or more actions includes the analytics system 110 ensuring that the particular resources are distributed equitably among the multiple network functions. For example, the analytics system 110 may determine that multiple network functions are impacted and may generate an instruction indicating that the particular resources are to be distributed equally among the multiple network functions. The analytics system 110 may provide the instruction to the resource controller, and the resource controller may cause the cloud computing environment to equally distribute the particular resources equally among the multiple network functions based on the instruction. In this way, the analytics system 110 may conserve computing resources, networking resources, and/or other resources that would have otherwise been consumed by losing network data due to service congestion and/or network outage.

In some implementations, if multiple network functions are impacted and the particular resources are insufficient to satisfy the resource modification, performing the one or more actions includes the analytics system 110 prioritizing the multiple network functions for distribution of the particular resources. For example, the analytics system 110 may determine that multiple network functions are impacted and that the particular resources are insufficient to satisfy the resource modification. The analytics system 110 may assign priority values to the multiple network functions, where a network function with a greater priority value shall receive a higher priority for the particular resources over a network function with a lesser priority value. The analytics system 110 may generate an instruction indicating that the particular resources are to be distributed based on the priority values assigned to the multiple network functions. The analytics system 110 may provide the instruction to the resource controller, and the resource controller may cause the cloud computing environment to distribute the particular resources to the multiple network functions according to the priority values and based on the instruction. In this way, the analytics system 110 may conserve computing resources, networking resources, and/or other resources that would have otherwise been consumed by handling lost network data caused by resource exhaustion.

Figure 1E:
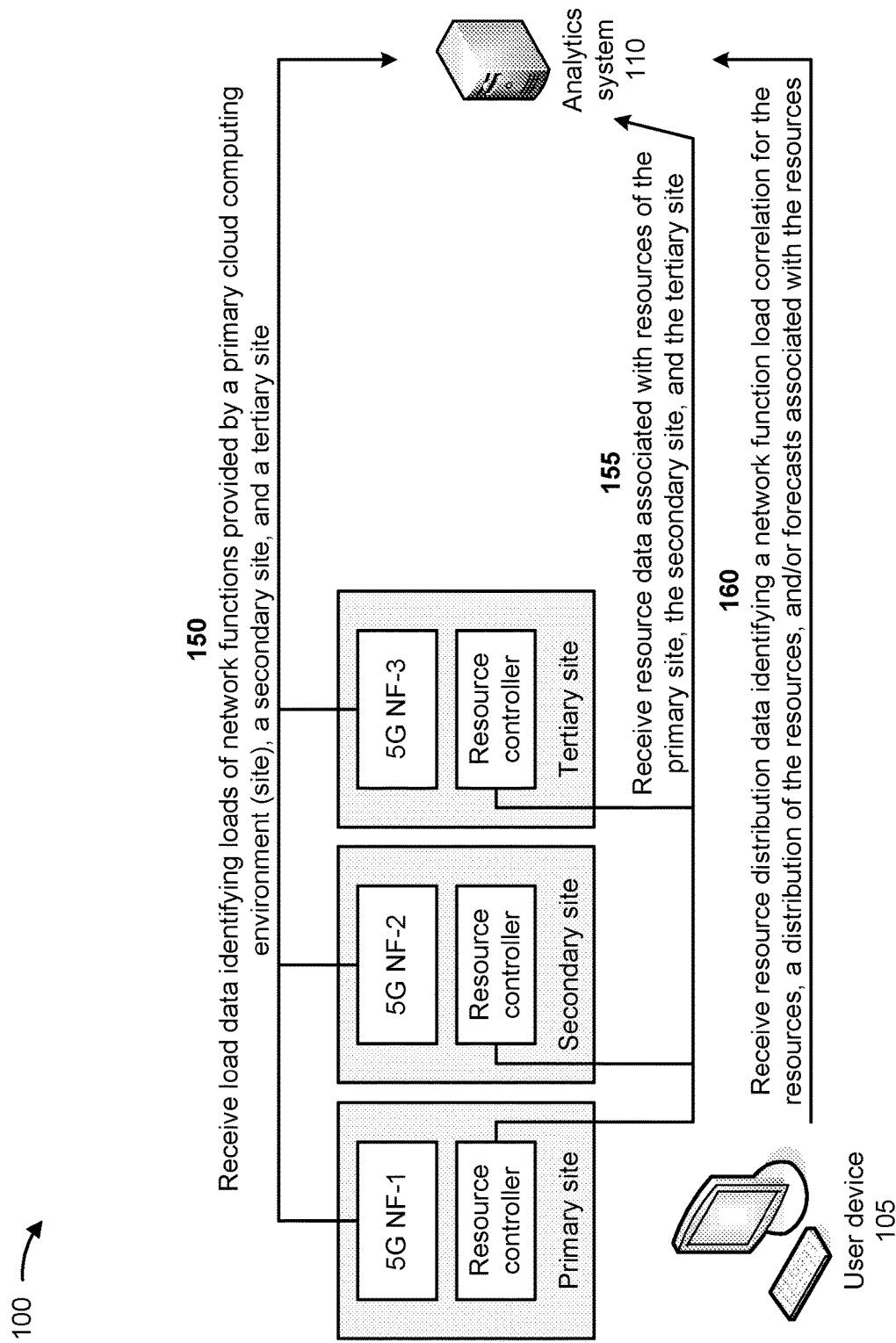

As shown in FIG. 1E, the cloud computing environment may be divided into multiple geographic locations or data centers, such as a primary site, a secondary site, and a tertiary site. Each of the sites may include a resource controller. The resource controller of the primary site may control resources associated with the primary site, the resource controller of the secondary site may control resources associated with the secondary site, and the resource controller of the tertiary site may control resources associated with the tertiary site. The resource controllers may control and utilize the resources to generate the multiple network functions provided by the primary site, the secondary site, and the tertiary site. In some implementations, the 5G network function provided by the primary site may be configured to accommodate one hundred percent of a required load, and the 5G network functions provided by the secondary site and the tertiary site may be configured with minimal resources.

As further shown in FIG. 1E, and by reference number 150, the analytics system 110 may receive load data identifying loads of network functions provided by a primary cloud computing environment (site), a secondary site, and a tertiary site. For example, the multiple network functions provided by the primary site, the secondary site, and the tertiary site may experience loads associated with utilization of the network functions. The network functions may generate the load data identifying the loads of the network functions and may provide the load data to the analytics system 110. The analytics system 110 may receive the load data from the network functions. In some implementations, the analytics system 110 may continuously receive the load data from the network functions, may periodically receive the load data from the network functions (e.g., via heartbeat requests), may receive the load data from the network functions based on providing requests for the load data to the network functions, and/or the like. In some implementations, the analytics system 110 may store the load data in the data structure associated with the analytics system 110.

As further shown in FIG. 1E, and by reference number 155, the analytics system 110 may receive resource data associated with resources of the primary site, the secondary site, and the tertiary site. For example, the resource controller of the primary site may monitor the resource data associated with the resources of the primary site, the resource controller of the secondary site may monitor the resource data associated with the resources of the secondary site, and the resource controller of the tertiary site may monitor the resource data associated with the resources of the tertiary site. The resource controllers of the primary site, the secondary site, and the tertiary site may provide the resource data to the analytics system 110, and the analytics system 110 may receive the resource data from the resource controllers. In some implementations, the analytics system 110 may continuously receive the resource data from the resource controllers, may periodically receive the resource data from the resource controllers (e.g., when there is a change in resource utilization), may receive the resource data from the resource controllers based on providing requests for the resource data to the resource controllers, and/or the like. In some implementations, the analytics system 110 may store the resource data in the data structure associated with the analytics system 110.

As further shown in FIG. 1E, and by reference number 160, the analytics system 110 may receive resource distribution data identifying a network function load correlation for the resources, a distribution of the resources, and/or forecasts associated with the resources. For example, the user may input the resource distribution data to the user device 105. The user device 105 may provide the resource distribution data to the analytics system 110, and the analytics system 110 may receive the resource distribution data from the user device 105. In some implementations, the analytics system 110 may store the resource distribution data in the data structure associated with the analytics system 110.

Figure 1F:
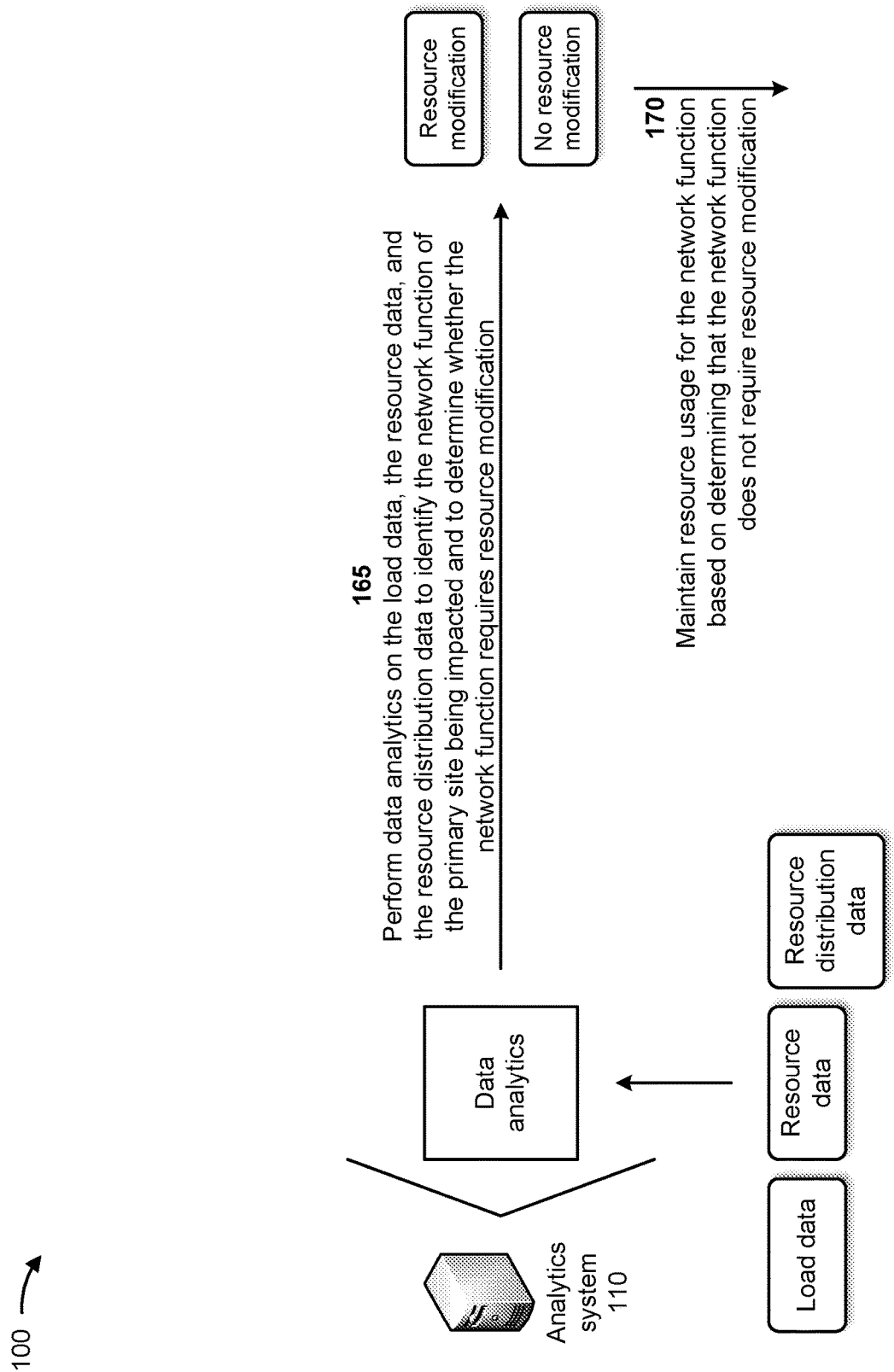

As shown in FIG. 1F, and by reference number 165, the analytics system 110 may perform the data analytics on the load data, the resource data, and the resource distribution data to identify the network function of the primary site being impacted and to determine whether the network function requires resource modification. For example, the analytics system 110 may perform the data analytics on the load data, the resource data, and the resource distribution data to identify the network function of the primary site being impacted. For example, the data analytics may indicate that the network function of the primary site is exhausting resources of the primary site, that the network function is underutilizing resources of the primary site, and/or the like. In some implementations, the analytics system 110 may perform the data analytics on the load data, the resource data, and the resource distribution data to determine whether the network function of the primary site requires resource modification. For example, if the network function of the primary site is exhausting resources, the data analytics may determine that the network function requires a resource modification of receiving additional resources from the primary site. In some implementations, the analytics system 110 may determine that the network function requires resource modification. Alternatively, the analytics system 110 may determine that the network function does not require resource modification. In some implementations, the analytics system 110 may determine that multiple network functions are impacted and/or require resource modifications.

As further shown in FIG. 1F, and by reference number 170, the analytics system 110 may maintain resource usage for the network function based on determining that the network function does not require resource modification. For example, when the analytics system 110 determines that the network function of the primary site does not require resource modification, the analytics system 110 maintains the resource usage for the network function. In this way, the network function may continue to operate with current allocated resources from the primary site.

Figure 1G:
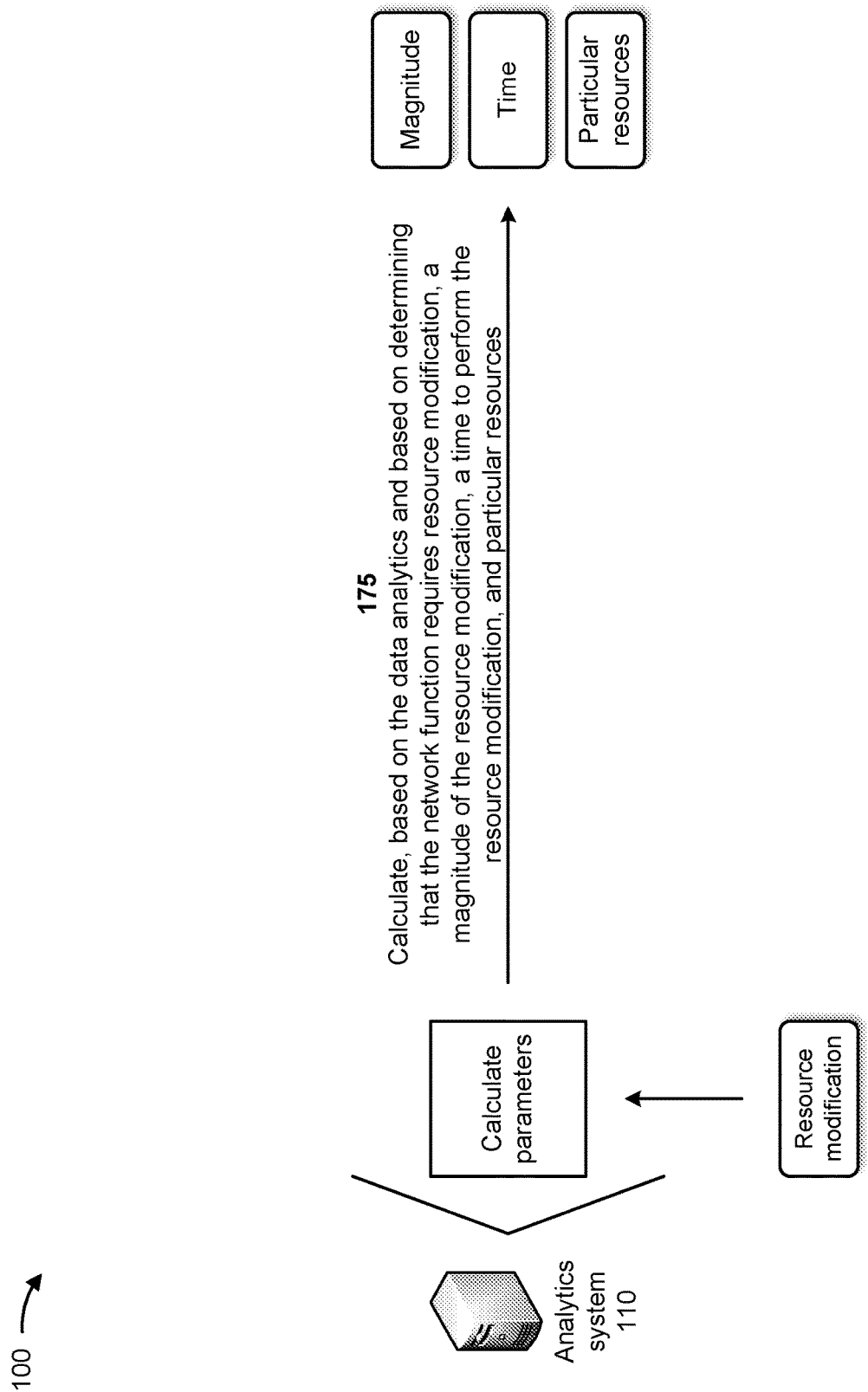

As shown in FIG. 1G, and by reference number 175, the analytics system 110 may calculate, based on the data analytics and based on determining that the network function requires resource modification, a magnitude of the resource modification, a time to perform the resource modification, and particular resources for the resource modification. For example, when the analytics system 110 determines that the network function of the primary site requires resource modification, the analytics system 110 may calculate parameters for the resource modification based on the data analytics. In some implementations, the parameters for the resource modification may include a parameter identifying a magnitude of the resource modification, a parameter identifying a time to perform the resource modification, a parameter identifying particular resources (e.g., available resources of the primary site) for the resource modification, and/or the like.

Figure 1H:
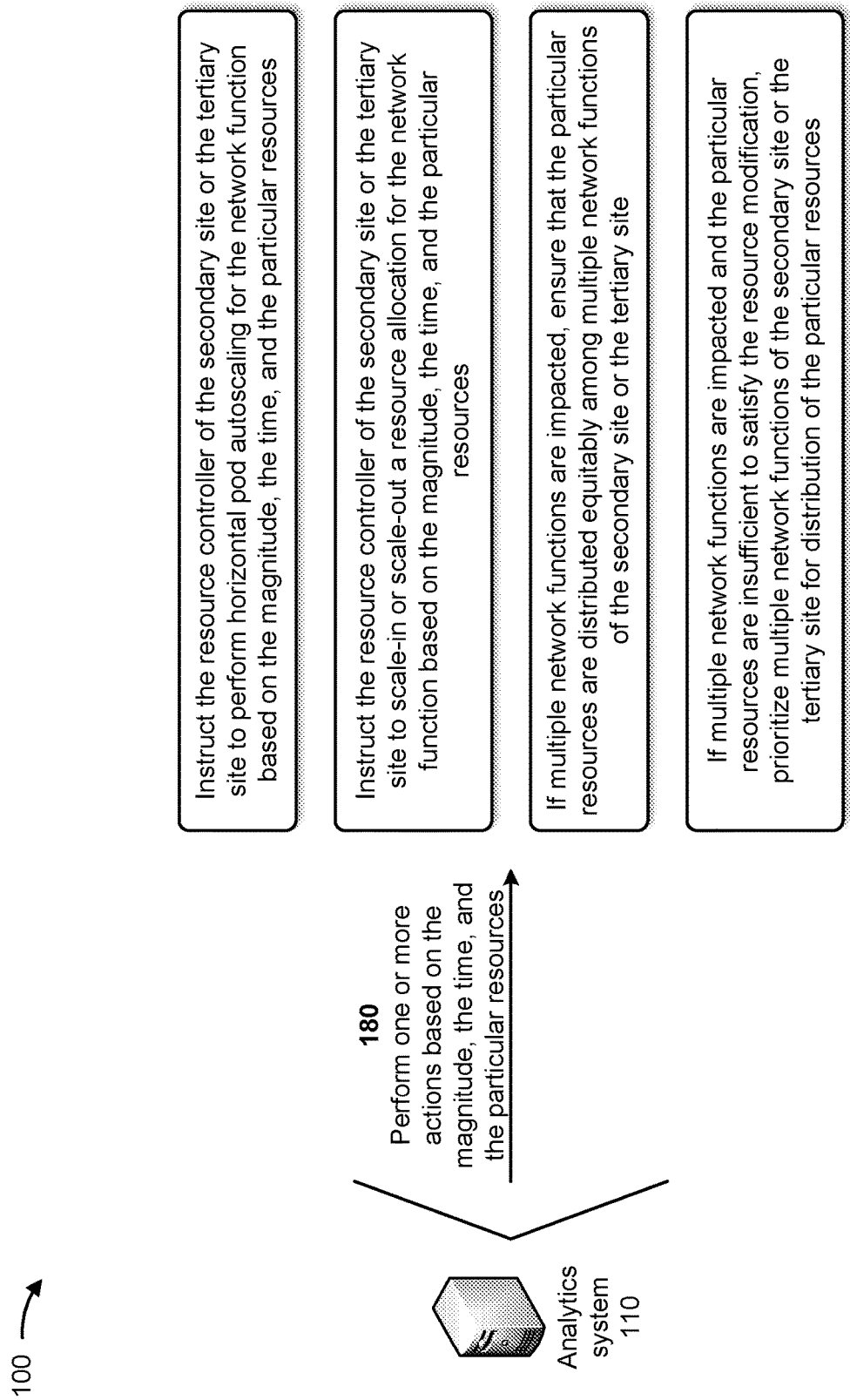

As shown in FIG. 1H, and by reference number 180, the analytics system 110 may perform one or more actions based on the magnitude, the time, and the particular resources. For example, the analytics system 110 may perform the one or more actions based on the parameters for the resource modification (e.g., the magnitude of the resource modification, the time to perform the resource modification, the particular resources for the resource modification, and/or the like).

In some implementations, performing the one or more actions includes the analytics system 110 instructing the resource controller of the secondary site or the tertiary site to perform horizontal pod autoscaling for the network function based on the magnitude, the time, and the particular resources. For example, the analytics system 110 may determine that the parameters for the resource modification indicate that horizontal pod autoscaling is required for the secondary site or the tertiary site. The analytics system 110 may instruct the resource controller of the secondary site or the tertiary site to perform the horizontal pod autoscaling for the network function and the resource controller may perform the horizontal pod autoscaling in the secondary site or the tertiary site based on the instruction. In this way, the analytics system 110 may conserve computing resources, networking resources, and/or other resources that would have otherwise been consumed by losing network data due to service congestion and/or network outage.

In some implementations, performing the one or more actions includes the analytics system 110 instructing the resource controller of the secondary site or the tertiary site to scale-in or scale-out a resource allocation for the network function based on the magnitude, the time, and the particular resources. For example, the analytics system 110 may determine that the parameters for the resource modification indicate that scaling in (e.g., decreasing) or scaling out (e.g., increasing) a resource allocation is required for the network function. The analytics system 110 may instruct the resource controller of the secondary site or the tertiary site to decrease or increase the resource allocation for the network function and the resource controller may cause the secondary site or the tertiary site to decrease or increase the resource allocation for the network function based on the instruction. In this way, the analytics system 110 may conserve computing resources, networking resources, and/or other resources that would have otherwise been consumed by handling lost network data caused by resource exhaustion.

In some implementations, if multiple network functions are impacted, performing the one or more actions includes the analytics system 110 ensuring that the particular resources are distributed equitably among multiple network functions of the secondary site or the tertiary site. For example, the analytics system 110 may determine that multiple network functions are impacted and may generate an instruction indicating that the particular resources are to be distributed equally among the multiple network functions of the secondary site or the tertiary site. The analytics system 110 may provide the instruction to the resource controller of the secondary site or the tertiary site, and the resource controller may cause the secondary site or the tertiary site to equally distribute the particular resources equally among the multiple network functions based on the instruction. In this way, the analytics system 110 may conserve computing resources, networking resources, and/or other resources that would have otherwise been consumed by losing network data due to service congestion and/or network outage.

In some implementations, if multiple network functions are impacted and the particular resources are insufficient to satisfy the resource modification, performing the one or more actions includes the analytics system 110 prioritizing the multiple network functions of the secondary site or the tertiary site for distribution of the particular resources. For example, the analytics system 110 may determine that multiple network functions are impacted and that the particular resources are insufficient to satisfy the resource modification. The analytics system 110 may assign priority values to the multiple network functions. The analytics system 110 may generate an instruction indicating that the particular resources are to be distributed based on the priority values assigned to the multiple network functions. The analytics system 110 may provide the instruction to the resource controller of the secondary site or the tertiary site, and the resource controller may cause of secondary site or the tertiary site to distribute the particular resources to the multiple network functions according to the priority values and based on the instruction. In this way, the analytics system 110 may conserve computing resources, networking resources, and/or other resources that would have otherwise been consumed by handling lost network data caused by resource exhaustion.

In this way, the analytics system 110 provides 5G network function on demand resource distribution. For example, the analytics system 110 may receive load data associated with network functions provided by a cloud computing environment, resource data associated with resources of the cloud computing environment, and resource distribution data. The analytics system 110 may perform data analytics on the load data, the resource data, and the resource distribution data to identify a network function that requires resource modification. The analytics system 110 may determine parameters for the resource modification (e.g., a magnitude of the resource modification, a time to perform the resource modification, particular resources of the cloud computing environment to modify, and/or the like) and may perform the resource modification based on the parameters. Thus, the analytics system 110 may conserve computing resources, networking resources, and/or other resources that would have otherwise been consumed by allocating resources that are minimally utilized, losing network data due to service congestion and/or network outage, handling lost network data caused by resource exhaustion, attempting to identify a network function associated with exhausted resources, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
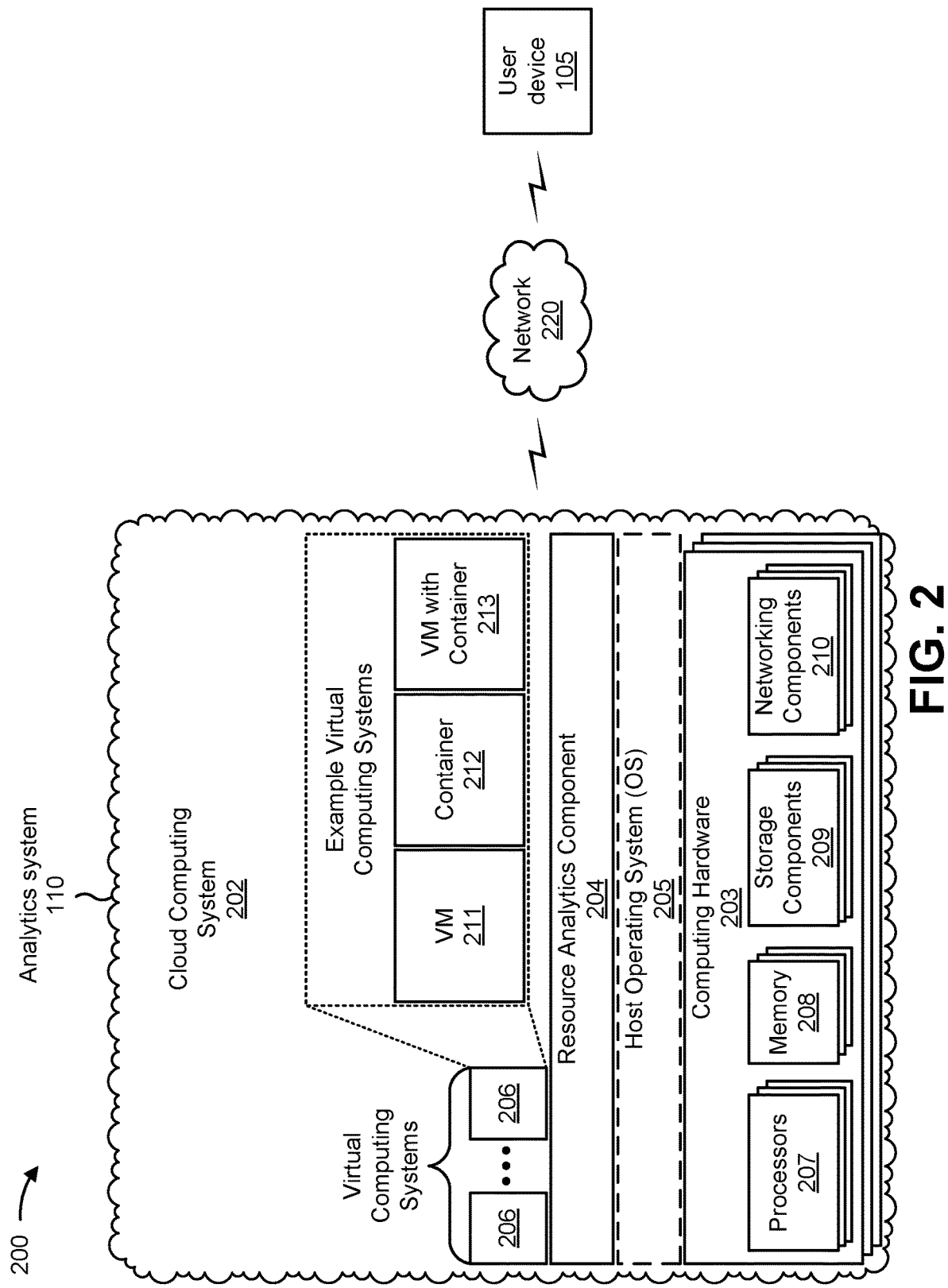
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the analytics system 110, which may include one or more elements of and/or may execute within a cloud computing system 202. The cloud computing system 202 may include one or more elements 203-213, as described in more detail below. As further shown in FIG. 2, the environment 200 may include the user device 105 and/or a network 220. Devices and/or elements of the environment 200 may interconnect via wired connections and/or wireless connections.

The user device 105 may include one or more devices capable of receiving, generating, storing, processing, and/or providing information associated, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the analytics system 110 may include one or more elements 203-213 of the cloud computing system 202, may execute within the cloud computing system 202, and/or may be hosted within the cloud computing system 202, in some implementations, the analytics system 110 may not be cloud-based (e.g., may be implemented outside of a cloud computing system) or may be partially cloud-based. For example, the analytics system 110 may include one or more devices that are not part of the cloud computing system 202, such as a device 300 of FIG. 3, which may include a standalone server or another type of computing device. The analytics system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
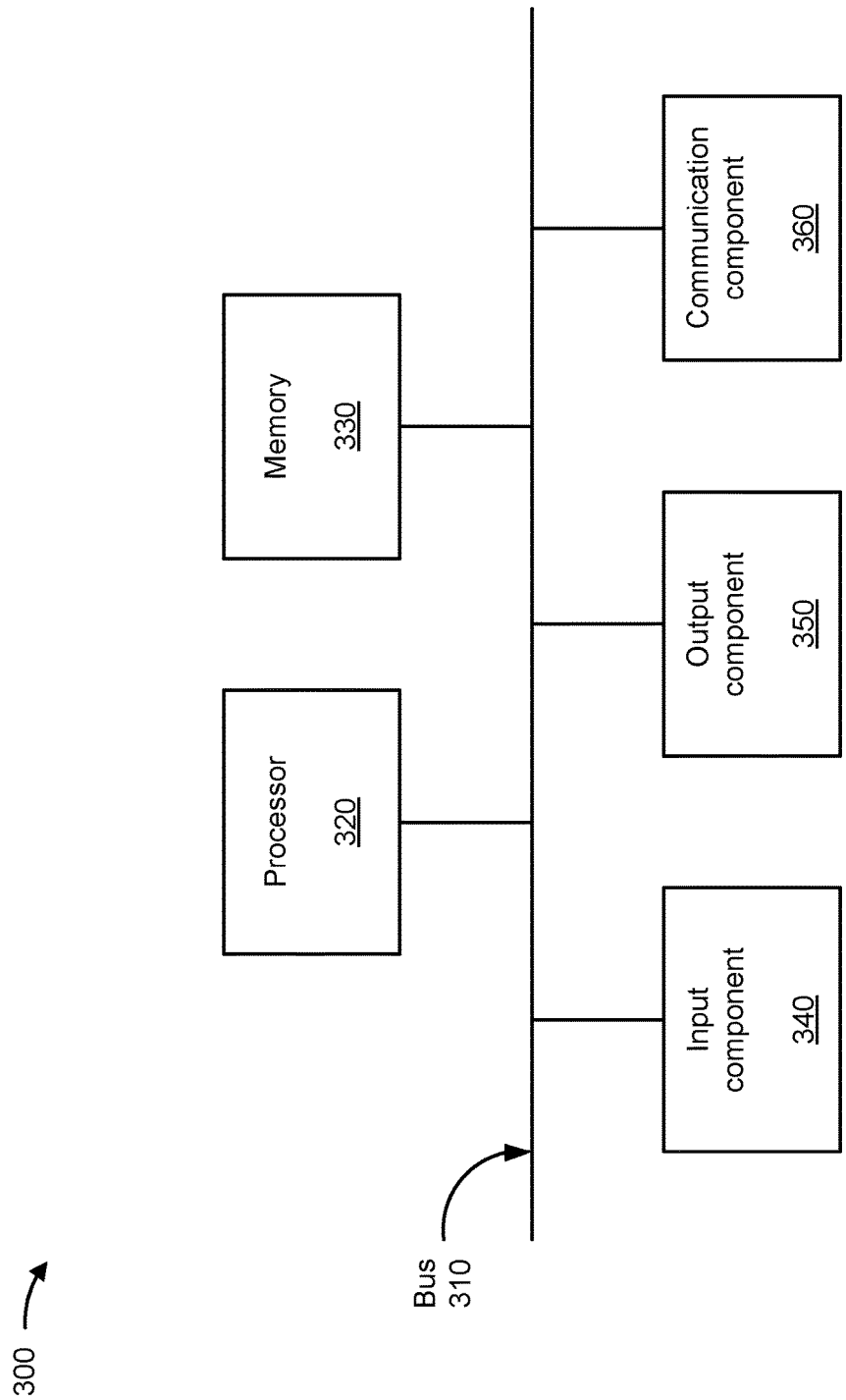
FIG. 3 is a diagram of example components of one or more devices of FIG. 2.

FIG. 3 is a diagram of example components of a device 300, which may correspond to the user device 105 and/or the analytics system 110. In some implementations, the user device 105 and/or the analytics system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 depicts a flowchart of an example process 400 for providing 5G network function on demand resource distribution. In some implementations, one or more process blocks of FIG. 4 may be performed by a device (e.g., the analytics system 110). In some implementations, one or more process blocks of FIG. 4 may be performed by another device or a group of devices separate from or including the device, such as a user device (e.g., the user device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving load data identifying loads of network functions provided by a cloud computing environment, resource data associated with resources of the cloud computing environment, and resource distribution data associated with the resources (block 410). For example, the device may receive load data identifying loads of network functions provided by a cloud computing environment, resource data associated with resources of the cloud computing environment, and resource distribution data associated with the resources, as described above. In some implementations, the resource distribution data includes data identifying one or more of a network function load correlation for the resources, a distribution of the resources, or forecasts associated with the resources. In some implementations, when the cloud computing environment includes at least a primary site, a secondary site, and a tertiary site, the load data includes data identifying loads of network functions provided by the at least the primary site, the secondary site, and the tertiary site; and the resource data includes data associated with resources of the at least the primary site, the secondary site, and the tertiary site.

As further shown in FIG. 4, process 400 may include performing data analytics on the load data, the resource data, and the resource distribution data to identify a network function being impacted and to determine that the network function requires resource modification (block 420). For example, the device may perform data analytics on the load data, the resource data, and the resource distribution data to identify, from the network functions, a network function being impacted and to determine that the network function requires resource modification, as described above. In some implementations, performing the data analytics on the load data, the resource data, and the resource distribution data includes performing the data analytics on the load data, the resource data, and the resource distribution data to identify a network function of the primary site being impacted and to determine whether the network function requires resource modification.

As further shown in FIG. 4, process 400 may include calculating, based on the data analytics, parameters for the resource modification (block 430). For example, the device may calculate, based on the data analytics and based on determining that the network function requires resource modification, parameters for the resource modification, as described above. In some implementations, the parameters for the resource modification include one or more of a parameter identifying a magnitude of the resource modification, a parameter identifying a time to perform the resource modification, or a parameter identifying particular resources for the resource modification.

As further shown in FIG. 4, process 400 may include performing one or more actions based on the parameters for the resource modification (block 440). For example, the device may perform one or more actions based on the parameters for the resource modification, as described above. In some implementations, performing the one or more actions includes one or more of instructing the cloud computing environment to perform horizontal pod autoscaling for the network function based on the parameters for the resource modification, or instructing the cloud computing environment to scale-in or scale-out a resource allocation for the network function based on the parameters for the resource modification. In some implementations, performing the one or more actions includes distributing the resources equitably among the multiple network functions. In some implementations, performing the one or more actions includes prioritizing the multiple network functions for distribution of the resources.

In some implementations, performing the one or more actions includes instructing the secondary site or the tertiary site to perform horizontal pod autoscaling for the network function based on the parameters for the resource modification. In some implementations, performing the one or more actions includes instructing the secondary site or the tertiary site to scale-in or scale-out a resource allocation for the network function based on the parameters for the resource modification. In some implementations, when the network function is part of multiple network functions requiring multiple resource modifications, performing the one or more actions includes distributing the resources equitably among the multiple network functions of the secondary site or the tertiary site. In some implementations, when the network function is part of multiple network functions requiring multiple resource modifications and the resources are insufficient to perform the multiple resource modifications, performing the one or more actions includes prioritizing the multiple network functions of the secondary site or the tertiary site for distribution of the resources.

In some implementations, process 400 includes identifying, from the network functions, another network function being impacted, determining that the other network function does not require resource modification, and maintaining resource usage for the other network function based on determining that the other network function does not require resource modification.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a first device, load data identifying loads of network functions provided by a cloud computing environment, resource data associated with resources of the cloud computing environment, and resource distribution data associated with the resources,
      wherein the load data and the resource data are received from the cloud computing environment, and wherein the resource distribution data is received from a user device different from the first device;
   performing, by the first device, data analytics on the load data, the resource data, and the resource distribution data to identify, from the network functions, a network function being impacted and to determine that the network function requires resource modification;
   calculating, by the first device, based on the data analytics and based on determining that the network function requires resource modification, parameters for the resource modification; and
   performing, by the first device, one or more actions based on the parameters for the resource modification.

2. The method of claim 1, wherein the resource distribution data includes data identifying one or more of a network function load correlation for the resources, a distribution of the resources, or forecasts associated with the resources.

3. The method of claim 1, further comprising:
   identifying, from the network functions, another network function being impacted;
   determining that the other network function does not require resource modification; and
   maintaining resource usage for the other network function based on determining that the other network function does not require resource modification.

4. The method of claim 1, wherein the parameters for the resource modification include one or more of:
   a parameter identifying a magnitude of the resource modification,
   a parameter identifying a time to perform the resource modification, or
   a parameter identifying particular resources for the resource modification.

5. The method of claim 1, wherein performing the one or more actions comprises one or more of:

instructing the cloud computing environment to perform horizontal pod autoscaling for the network function based on the parameters for the resource modification; or instructing the cloud computing environment to scale-in or scale-out a resource allocation for the network function based on the parameters for the resource modification.

6. The method of claim 1, wherein, when the network function is part of multiple network functions requiring multiple resource modifications, performing the one or more actions comprises:

distributing the resources equitably among the multiple network functions.

7. The method of claim 1, wherein, when the network function is part of multiple network functions requiring multiple resource modifications and the resources are insufficient to perform the multiple resource modifications, performing the one or more actions comprises:

prioritizing the multiple network functions for distribution of the resources.

8. A first device, comprising:

one or more processors configured to:
receive load data identifying loads of network functions provided by a cloud computing environment, resource data associated with resources of the cloud computing environment, and resource distribution data associated with the resources,
wherein the load data and the resource data are received from the cloud computing environment, and wherein the resource distribution data is received from a user device different from the first device;
perform data analytics on the load data, the resource data, and the resource distribution data to identify, from the network functions, a network function being impacted and to determine that the network function requires resource modification;
calculate, based on the data analytics and based on determining that the network function requires resource modification, parameters for the resource modification
wherein the parameters for the resource modification include one or more of a parameter identifying a magnitude of the resource modification, a parameter identifying a time to perform the resource modification, or a parameter identifying particular resources for the resource modification; and
perform one or more actions based on the parameters for the resource modification.

9. The first device of claim 8, wherein, when the cloud computing environment includes at least a primary site, a secondary site, and a tertiary site, the load data includes data identifying loads of network functions provided by the at least the primary site, the secondary site, and the tertiary site, and the resource data includes data associated with resources of the at least the primary site, the secondary site, and the tertiary site.

10. The first device of claim 9, wherein the one or more processors, to perform the data analytics on the load data, the resource data, and the resource distribution data, are configured to:

perform the data analytics on the load data, the resource data, and the resource distribution data to identify a network function of the primary site being impacted and to determine whether the network function requires resource modification.

11. The first device of claim 9, wherein the one or more processors, to perform the one or more actions, are configured to:

instruct the secondary site or the tertiary site to perform horizontal pod autoscaling for the network function based on the parameters for the resource modification.

12. The first device of claim 9, wherein the one or more processors, to perform the one or more actions, are configured to:

instruct the secondary site or the tertiary site to scale-in or scale-out a resource allocation for the network function based on the parameters for the resource modification.

13. The first device of claim 9, wherein, when the network function is part of multiple network functions requiring multiple resource modifications, the one or more processors, to perform the one or more actions, are configured to:

distribute the resources equitably among the multiple network functions of the secondary site or the tertiary site.

14. The first device of claim 9, wherein, when the network function is part of multiple network functions requiring multiple resource modifications and the resources are insufficient to perform the multiple resource modifications, the one or more processors, to perform the one or more actions, are configured to:

prioritize the multiple network functions of the secondary site or the tertiary site for distribution of the resources.

15. A non-transitory computer-readable medium storing a set of instructions, the set of instructions comprising:

one or more instructions that, when executed by one or more processors of a first device, cause the first device to:
receive load data identifying loads of network functions provided by a cloud computing environment, resource data associated with resources of the cloud computing environment, and resource distribution data associated with the resources,
wherein the load data and the resource data are received from the cloud computing environment, and the resource distribution data is received from a user device different from the first device, and
wherein the resource distribution data includes data identifying one or more of a network function load correlation for the resources, a distribution of the resources, or forecasts associated with the resources;
perform data analytics on the load data, the resource data, and the resource distribution data to identify, from the network functions, a network function being impacted and to determine that the network function requires resource modification;
calculate, based on the data analytics and based on determining that the network function requires resource modification, parameters for the resource modification; and
perform one or more actions based on the parameters for the resource modification.

16. The non-transitory computer-readable medium of claim 15, wherein the one or more instructions further cause the first device to:
identify, from the network functions, another network function being impacted;
determine that the other network function does not require resource modification; and maintain resource usage for the other network function based on determining that the other network function does not require resource modification.

17. The non-transitory computer-readable medium of claim 15, wherein the one or more instructions, that cause the first device to perform the one or more actions, cause the first device to:
   instruct the cloud computing environment to perform horizontal pod autoscaling for the network function based on the parameters for the resource modification; or
   instruct the cloud computing environment to scale-in or scale-out a resource allocation for the network function based on the parameters for the resource modification.

18. The non-transitory computer-readable medium of claim 15, wherein, when the network function is part of multiple network functions requiring multiple resource modifications, the one or more instructions, that cause the first device to perform the one or more actions, cause the first device to:
   distribute the resources equitably among the multiple network functions.

19. The non-transitory computer-readable medium of claim 15, wherein, when the network function is part of multiple network functions requiring multiple resource modifications and the resources are insufficient to perform the multiple resource modifications, the one or more instructions, that cause the first device to perform the one or more actions, cause the first device to:
   prioritize the multiple network functions for distribution of the resources.

20. The non-transitory computer-readable medium of claim 15, the cloud computing environment includes at least a primary site, a secondary site, and a tertiary site.

* * * * *